United States Patent

Ruef

(10) Patent No.: US 9,515,507 B2
(45) Date of Patent: Dec. 6, 2016

(54) ENERGY-SAVING CIRCUIT FOR A NETWORK-POWERED DEVICE, NETWORK ARRANGEMENT AND ENERGY-SAVING METHOD

(75) Inventor: Robert Ruef, Friedberg (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 568 days.

(21) Appl. No.: 13/812,624

(22) PCT Filed: Jun. 7, 2011

(86) PCT No.: PCT/EP2011/059384
§ 371 (c)(1),
(2), (4) Date: Mar. 21, 2013

(87) PCT Pub. No.: WO2012/013404
PCT Pub. Date: Feb. 2, 2012

(65) Prior Publication Data
US 2014/0111009 A1    Apr. 24, 2014

(30) Foreign Application Priority Data

Jul. 28, 2010 (DE) .......................... 10 2010 032 513

(51) Int. Cl.
*H04L 12/10* (2006.01)
*H04M 19/00* (2006.01)
(Continued)

(52) U.S. Cl.
CPC ....... *H02J 7/0068* (2013.01); *H04L 12/40013* (2013.01); *H04L 12/40045* (2013.01); *Y10T 307/391* (2015.04)

(58) Field of Classification Search
CPC ................ H02J 7/0068; H04L 12/4001; H04L 12/40045; H04L 12/10; Y10T 307/391
(Continued)

(56) References Cited

U.S. PATENT DOCUMENTS 5,523,665 A * 6/1996 Deaver .................. H02H 3/023
320/135
7,355,416 B1 * 4/2008 Darshan .................. H04L 12/10
324/713
(Continued)

FOREIGN PATENT DOCUMENTS

DE        39 09 064 A1    9/1990
DE        103 17 300 A1   12/2004
(Continued)

OTHER PUBLICATIONS

Carrier Sense Multiple Access with Collision Detection (CSMA/CD) Access Method and Physical Layer Specifications—Data Terminal Equipment (DTE) Power via the Media Dependent Interface (MDI) Enhancements, IEEE Standard for Information Technology—Telecommunications and information exchange between systems—Local and metropolitan area networks—Specific requirements, Part 3, Amendment 3, Std 802.3at-2009 (Amendment to IEEE Std 802.3-2008), 2009, S. 1-123.
(Continued)

*Primary Examiner* — Rexford Barnie
*Assistant Examiner* — Thai Tran
(74) *Attorney, Agent, or Firm* — DLA Piper LLP (US)

(57) ABSTRACT

An energy-saving circuit for a network-powered device (PD) having a converter circuit that produces an operating voltage ($V_{OUT}$) for the device (PD) from a supply voltage ($V_{PSE}$) which can be provided via a includes at least one switching element that breaks at least one electrical connection between the network and the converter circuit, at least one control circuit that actuates the at least one switching element on the basis of control signals that switch on and/or off and are received from the device, and at least one energy buffer that stores energy from voltage pulses, provided via
(Continued)

the network, to supply the control circuit with operating power.

14 Claims, 4 Drawing Sheets

(51) Int. Cl.
*H04M 19/08* (2006.01)
*H02J 7/00* (2006.01)
*H04L 12/40* (2006.01)

(58) Field of Classification Search
USPC .......................... 307/29; 455/402; 713/300
See application file for complete search history.

(56) References Cited

U.S. PATENT DOCUMENTS

| | | |
|---|---|---|
| 2005/0264973 A1 | 12/2005 | Gardner et al. |
| 2006/0100799 A1* | 5/2006 | Karam .................. G06F 1/26 702/57 |
| 2006/0164108 A1* | 7/2006 | Herbold .................. H04L 12/10 324/691 |
| 2006/0271678 A1* | 11/2006 | Jessup .................. G06F 1/3203 709/224 |
| 2009/0147413 A1* | 6/2009 | Aoki .......................... F24C 7/08 361/42 |

FOREIGN PATENT DOCUMENTS

| | | | |
|---|---|---|---|
| JP | 2000-115222 | 4/2000 | |
| JP | 2007-259339 | 10/2007 | |
| JP | 2008-521342 | 6/2008 | |
| JP | 2008-529461 | 7/2008 | |
| JP | 2010-140241 | 6/2010 | |
| WO | 2004/040891 A2 | 5/2004 | |
| WO | WO 2004040891 A2 * | 5/2004 | ............ H04M 11/06 |

OTHER PUBLICATIONS

A Japanese Examination Report dated Feb. 25, 2014 for corresponding Japanese Application No. 20013-521027.

* cited by examiner

ENERGY-SAVING CIRCUIT FOR A NETWORK-POWERED DEVICE, NETWORK ARRANGEMENT AND ENERGY-SAVING METHOD

RELATED APPLICATIONS

This is a §371 of International Application No. PCT/EP2011/059384, with an international filing date of Jun. 7, 2011 (WO 2012/013404 A1, published Feb. 2, 2012), which is based on German Patent Application No. 10 2010 032 513.9, filed Jul. 28, 2010, the subject matter of which is incorporated herein by reference.

TECHNICAL FIELD

This disclosure relates to an energy-saving circuit for a network-powered device having a converter circuit that produces an operating voltage for the device from a supply voltage which can be provided via a network. The disclosure also relates to a network arrangement comprising a supply unit and at least one network-powered device and also to an energy-saving method for a network-powered device.

BACKGROUND

Various methods and apparatuses for the remote and network powering of electrical devices are known. By way of example, IEEE standard 802.3af, known as "Power over Ethernet" (PoE), discloses the practice of supplying network components having a relatively low power draw of between approximately 5 and 15 W with a supply voltage via a network line of a local area data network (LAN).

The advantages of network powering of devices are first that it is possible to dispense with separate power supply cables or power supply units in the region of the devices. In addition, the supply of power to the relevant devices can be safeguarded centrally for all network-powered devices by an uninterruptible power supply to the supply unit.

Figure 1:
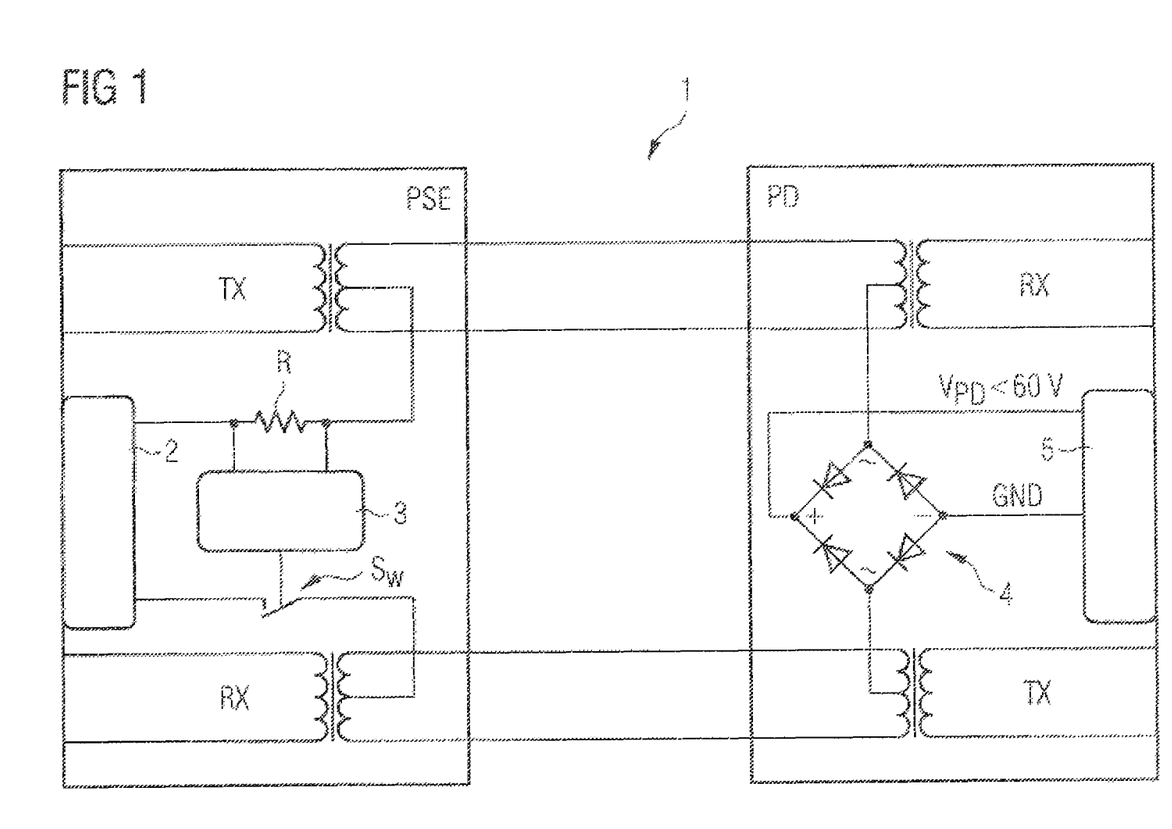
FIG. 1 shows a known network arrangement for remotely powering a network-powered device.

FIG. 1 shows an arrangement of the type in question for the remote powering of a network-powered load (powered device, PD). The network-powered device PD connects to a supply unit (Power Sourcing Equipment, PSE) by a network cable 1.

In the arrangement shown, the network cable 1 comprises two wire pairs, one each for simultaneous sending (transmit, TX) and receiving (receive, RX). The transmitted and received signals are each transmitted as high-frequency AC voltage signals. These high-frequency AC voltage signals are impressed onto a DC voltage by two transformers for the supply unit PSE. The impressed DC voltage is used as a supply voltage for the network-powered device PD and is isolated from the high-frequency AC voltage signals therein by two further transformers.

The supply unit PSE comprises a voltage source 2 to provide the supply voltage. Furthermore, the supply unit PSE comprises a monitoring circuit 3 which selectively connects the voltage source 2 to the transformers of the supply unit PSE. The network-powered device PD comprises a rectifier 4 and also a converter circuit 5 that converts the supply voltage provided into an operating voltage for the network-powered device PD.

To avoid unnecessary power and transmission losses, the supply unit PSE comprises means for recognizing whether a network-powered device PD is connected to the network cable 1. In addition to recognizing whether a network-powered device PD is actually connected to the supply unit PSE, the means are also used to recognize one of various power classes for the network-powered device PD. To this end, the monitoring circuit 3 monitors a voltage drop in the supply voltage across a resistor R and, hence, indirectly determines the internal resistance of the connected device PD. If the current through the resistor R drops below a predetermined threshold value, the monitoring circuit 3 of the supply unit PSE assumes that the network-powered device PD has been isolated from the network cable 1 and interrupts the provision of the supply voltage by means of a switching element Sw, for example, a relay or semiconductor switching element.

The aforementioned arrangement and the associated protocols for device recognition are well-suited to supplying power to network components which usually draw a largely constant operating current and remain switched on during operation of the network. However, they are problematic when supplying power to terminals switched on and off under user control.

If such a terminal has an excessively low power consumption which is below the predetermined limit value in a switched-off or energy-saving state, the supply voltage from the supply device PSE is interrupted completely, with the result that it is no longer possible for the terminal to be woken from a switched-off or energy-saving state by the device PD. If the internal resistance of the network-powered device is so low that the supply unit also recognizes the network-powered device in the switched-off or energy-saving state, on the other hand, then the supply unit continuously executes an initialization sequence. This results in a poor energy balance both for the network-powered device and the supply unit and, hence, possibly in a breach of conditions for the operation of such devices.

It could therefore be helpful to provide an energy-saving circuit for a network-powered device. Furthermore, it could be helpful to provide a network arrangement suitable to supply power to a network-powered device in a manner sufficient in terms of energy consumption. Finally, it could be helpful to provide an energy-saving method for a network-powered device.

SUMMARY

I provide an energy-saving circuit for a network-powered device (PD) having a converter circuit that produces an operating voltage ($V_{OUT}$) for the device (PD) from a supply voltage ($V_{PSE}$) which can be provided via a network, including at least one switching element that breaks at least one electrical connection between the network and the converter circuit, at least one control circuit that actuates the at least one switching element on the basis of control signals that switch on and/or off and are received from the device, and at least one energy buffer that stores energy from voltage pulses, provided via the network, to supply the control circuit with operating power.

I also provided a network arrangement including a supply unit (PSE) that recognizes and supplies network-powered devices (PD) with a supply voltage ($V_{PSE}$), at least one network-powered device having an energy-saving circuit and a converter circuit that produces an operating voltage ($V_{OUT}$) for the device from the supply voltage ($V_{PSE}$), and at least one network cable which connects the supply unit (PSE) and the at least one network-powered device (PD) to one another, wherein the energy-saving circuit includes at least one switching element that breaks at least one electrical connection between the network cable and the converter circuit, at least one control circuit that actuates the at least one switching element on the basis of control signals that switch on and/or off and are received from the device, and at least one energy buffer that stores energy from voltage pulses, provided via the network, to supply the control circuit with an operating power.

I further provide an energy-saving method for a network-powered device including storing electrical power from voltage pulses provided via a network in an energy buffer, operating a control circuit with power stored in the energy buffer, recognizing a first device-end control signal that switches on the network-powered device by the control circuit, and actuating a switching element by the control circuit to make an electrical connection between the network and a converter circuit of the network-powered device.

LIST OF REFERENCE SYMBOLS

1 Network cable
2 Voltage source
3 Monitoring circuit
4 Rectifier
5 Converter circuit
6 Energy-saving circuit
7 Supply line
8 Switching element
9 Control circuit
10 Detection pulse
11 Classification pulse
12 Switch-on phase
PSE Supply unit
PD Network-powered device
S1 MOSFET
C1, C2 Capacitor
BR1 Rectifier
D1, D2 Diode
R Resistor
Sw Switching element
$V_{PSE}$ Supply voltage
$V_{PD}$ DC voltage
$V_{OUT}$ Operating voltage

DETAILED DESCRIPTION

We provide an energy-saving circuit for a network-powered device having a converter circuit that produces an operating voltage for the device from a supply voltage which can be provided via a network. The energy-saving circuit comprises at least one switching element that breaks at least one electrical connection between the network and the converter circuit, at least one control circuit that actuates the at least one switching element on the basis of control signals for switching on and/or off which are received from the device, and at least one energy buffer that stores the energy from voltage pulses, provided via the network, to supply the control circuit with an operating power.

Provision of a control circuit which can be operated largely independently of the converter circuit and the buffering of voltage pulses provided via the network in an energy buffer to supply the control circuit with operating power mean that it is possible to dispense with network powering of the network-powered device in a switched-off or energy-saving state. In this way, the power drawn by the network-powered device in a switched-off or energy-saving state can be lowered almost to zero without having to dispense with the advantages of network powering or device-end activation and deactivation. A supply unit used to supply power to the network-powered device is no longer able to recognize the device on account of the high internal resistance when the switching element is open, which means that no initialization sequence is executed either.

Preferably, the energy buffer is in the form of a capacitor, wherein buffer capacitance is sufficient to supply the control circuit with operating power for a predetermined period of time. The provision of a capacitor as an energy buffer is particularly inexpensive and simultaneously allows hazardous substances such as occur in rechargeable batteries to be dispensed with in the network-powered device. In this case, the capacitance of the capacitor can be set for a period between voltage pulses provided via the network that is usually predetermined by the standard.

Advantageously, the at least one switching element is in the form of a semiconductor switching element that operates a zero current, particularly in the form of a MOSFET. The use of a MOSFET or of a similar switching element allows a switched-on and/or switched-off state of the switching element to be held by the control circuit without this requiring an operating current.

We likewise provide a network arrangement comprising a supply unit that recognizes and supplies network-powered devices with a supply voltage, at least one network-powered device having an energy-saving circuit based on one of the examples above and at least one network cable which connects the supply unit and the at least one network-powered device to one another.

Such an arrangement is compliant with known standards for the network powering of devices. Only the network-powered device needs to be provided with an energy-saving circuit as has been described above. Changes to the supply unit or network cabling are not necessary, on the other hand.

We also provide an energy-saving method for a network-powered device comprising the following steps:
electrical power from voltage pulses provided via a network is stored in an energy buffer,
a control circuit is operated with power stored in the energy buffer,
a first device-end control signal that switches on the network-powered device is recognized by the control circuit, and
a switching element is actuated by the control circuit to make an electrical connection between the network and a converter circuit of the network-powered device.

The aforementioned method steps allow the continuous monitoring of a network-powered device for a control signal for switching on even when the converter circuit of the electrical device is electrically isolated from the network. This means that it is possible for the electrical device to be reactivated even in a quiescent or energy-saving state in which the electrical device draws no further electrical power from the network.

Further advantages are disclosed in the examples described below.

Figure 2:
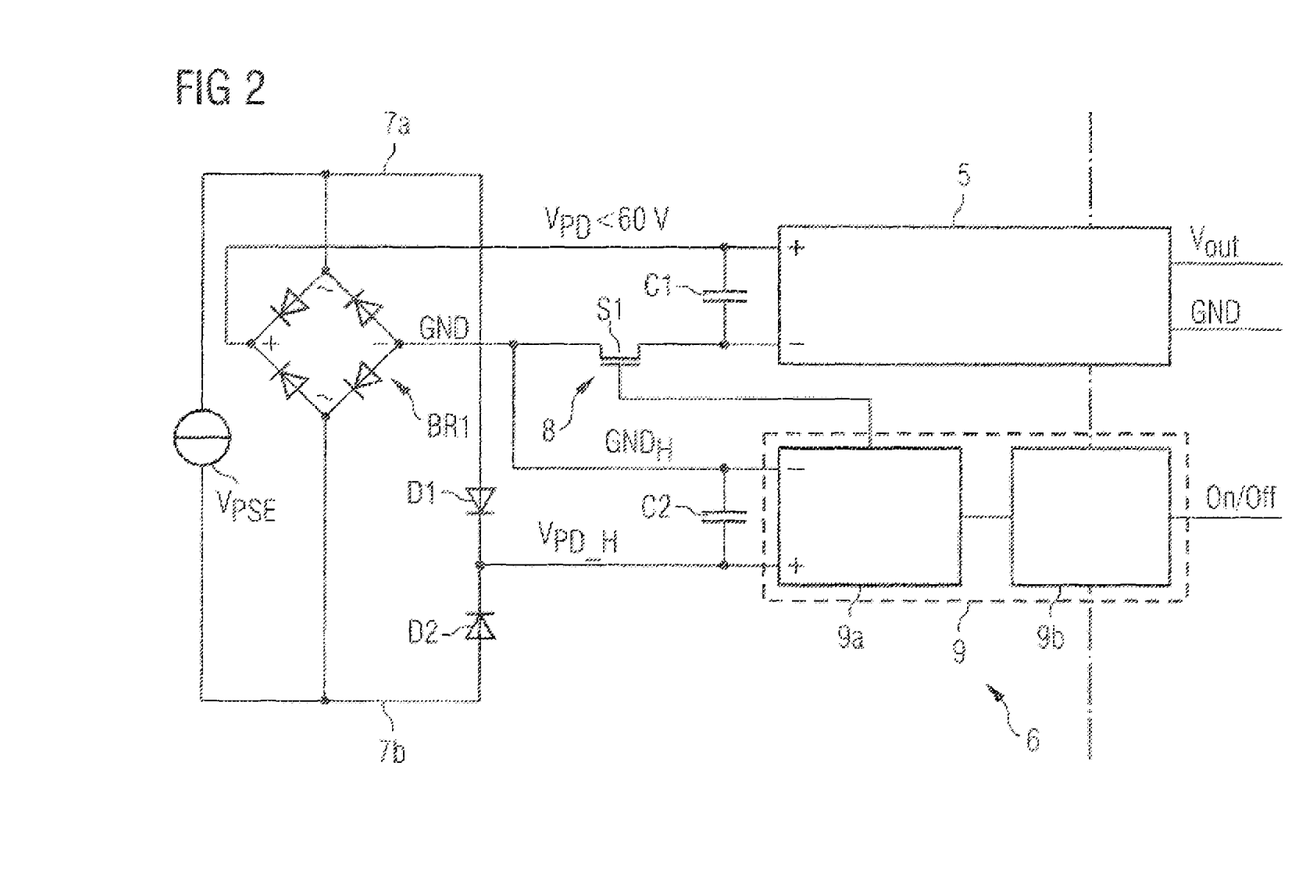
FIG. 2 shows a schematic illustration of an energy-saving circuit for a network-powered device.

FIG. 2 shows an energy-saving circuit 6 for use in a network arrangement, as has already been described with reference to FIG. 1.

The energy-saving circuit 6 connects to the network arrangement by two supply lines 7a and 7b. These can be used to provide a supply voltage $V_{PSE}$ from a supply unit PSE which is not shown in FIG. 2. The polarity of the supply voltage $V_{PSE}$ is not known by the device, which means that a rectifier BR1 connects between the first supply line 7a and the second supply line 7b. When the supply voltage $V_{PSE}$ is applied, the rectifier BR1 provides a DC voltage $V_{PD}$ in the range between 36 and 57 V, particularly 44 V or 48 V for IEEE standards 802.3af and 802.3at. This voltage is used to charge a smoothing capacitor C1 arranged in parallel with a downstream converter circuit 5. So as not to disturb detection of the network-powered device PD, the smoothing capacitor preferably has a capacitance of less than 120 nF.

To be able to isolate the electrical load represented by the smoothing capacitor C1 and the converter circuit 5 from the supply lines 7a and 7b, the ground connection GND of the rectifier BR1 and the negative connection of the smoothing capacitor C1 or of the converter circuit 5 have a switching element 8 provided between them which can be used to break an electrical connection between these points. It goes without saying that a break is also possible at another point. In the example, the switching element 8 is a normally-off MOSFET S1. The converter circuit 5 therefore connects to the rectifier BR1 only when a control input of the MOSFET S1 has a switching voltage applied to it.

The energy-saving circuit 6 furthermore has a control circuit 9 to provide the relevant switching voltage for the switching element 8. In the example, the control circuit 9 is shown in two parts and comprises particularly a microcontroller 9a with an associated voltage regulator and circuitry and also a transformer 9b that couples in control signals from the secondary side. Instead of the two-part arrangement comprising a microcontroller 9a and a transformer 9b, it is naturally also possible to use a discrete circuit.

To constantly supply at least the microcontroller 9a of the control circuit 9 with an operating voltage, the ground output GND of the converter circuit BR1 and the two supply lines 7a and 7b have an energy buffer in the form of a capacitor C2 connected between them. In this case, the lower connection of the capacitor C2 in the example is supplied with a positive voltage component from the supply line 7a or from the supply line 7b via the diode D1 or D2. Depending on the refinement and accessibility of the rectifier circuit BR1 in the upper load path, it is also possible for the rectification to be effected by the rectifier BR1 instead of by the diodes D1 and D2.

The capacitor C2 is dimensioned such that it is charged by what are known as "detection pulses" based on the Power-over-Ethernet (PoE) standard to an extent such that it holds an adequate charge ready to supply power to the microcontroller. By way of example, the PoE standard has provision for voltage pulses of between 2.7 and 10 V which are regularly provided by the supply unit PSE. On the basis of this standard, the minimum off time between successive pulses is at least 2 s. In the case of a capacitance of 100 nF, for example, it is thus possible to supply a particularly energy-saving microprocessor having a current draw of 25 nA, for example, with an operating voltage on a continuous basis.

Figure 3:
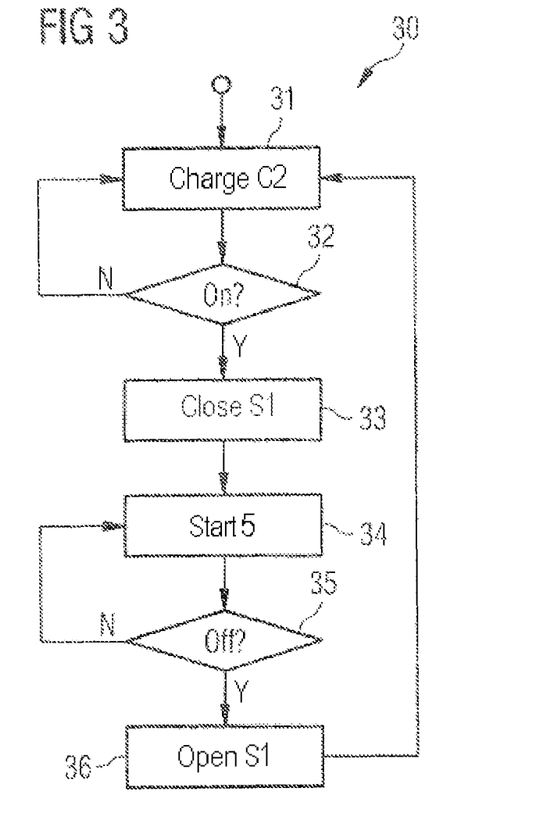
FIG. 3 shows a flowchart for an energy-saving method for a network-powered device.
Figure 4:
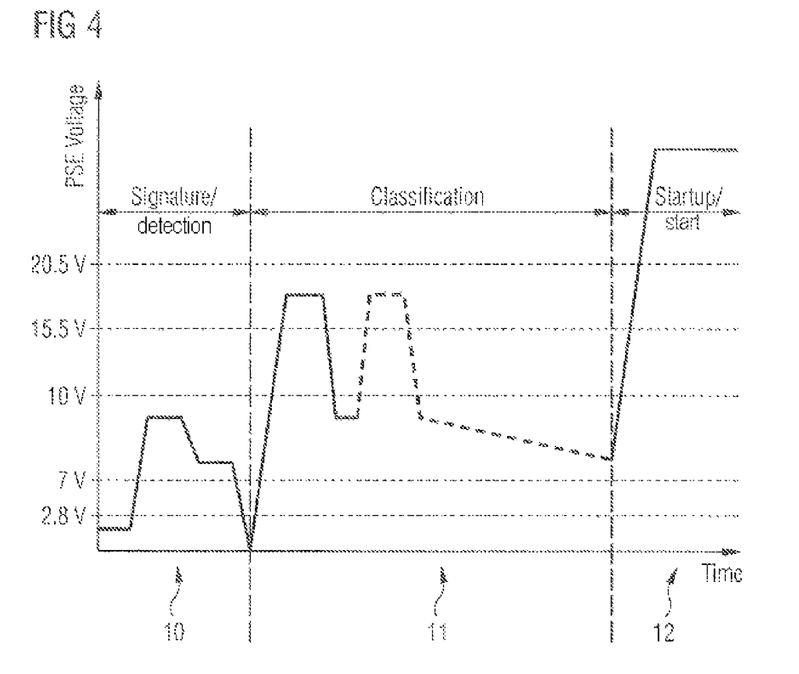
FIG. 4 shows a voltage profile during an initialization phase based on the Power-over-Ethernet standard.

The specific signaling in the example is described in more detail below with reference to the flowchart shown in FIG. 3 and the voltage profile shown in FIG. 4.

First, the network-powered device PD is in a switched-off state. In this state, the switching element 8 is open, which means that the converter circuit 5 does not provide any operating voltage to supply power to the electrical appliance. In this operating state, the supply unit PSE isolates the voltage source 2 from the supply lines 7a and/or 7b according to the standard.

In this operating state, however, what is known as a detection pulse 10 is regularly provided by the supply unit PSE. The characteristic of the detection pulse 10 is shown in FIG. 4. The detection pulse 10 is rectified by the diodes D1 and D2 and portions of the rectifier BR1 and used to charge the capacitor C2 (step 31).

In this phase of operation, the energy-saving circuit 6 has an internal resistance above a predetermined limit value, for example, 33 kΩ. The monitoring circuit 3 therefore does not recognize that a network-powered device PD is connected to the supply unit PSE, and for its part enters an energy-saving state until the next detection pulse 10 is emitted.

When a secondary-side switch-on signal is received via the transformer 9b, the microcontroller 9a of the control circuit 9 is activated (step 32). The switch-on signal is used as a trigger pulse for the control circuit 9. By way of example, it may involve pushing a switch-on pushbutton switch, arranged on the secondary side, on the network-powered device PD.

When such a switch-on control signal is present, the control circuit 9 activates the switching element 8 by applying an appropriate control voltage (step 33). Hence, the converter circuit 5 connects to the supply lines 7a and 7b and to the energy-saving circuit 6.

When the next detection pulse 10 is received, the converter circuit 5 reacts according to the logging on which the protocol used is based, which means that the monitoring circuit 3 of the supply unit PSE can recognize the connection of the device PD. In particular, a rise in the flow of current via the supply lines 7a and 7b results in a relatively large voltage drop across the resistor R (step 34). By way of example, the network-powered device PD has an internal resistance in the range from 15 to 33 kΩ in this phase of operation on the basis of the PoE standard.

As a reaction to successful detection, the supply unit PSE next sends one or more "classification pulse(s)" 11 to the network-powered device PD. The monitoring circuit 3 of the supply unit PSE in turn determines the current draw by the network-powered device PD to determine one of four possible power classes for the device PD, for example.

Only after successful signaling of the power class does the supply unit PSE then activate a supply voltage $V_{PSE}$ of between 44 and 48 V, for example, in a switch-on phase 12. In this state, both the supply unit PSE and the network-powered device PD are in a completely switched-on state. In this operating state, the control circuit 9 keeps an actuation signal for the switching element 8 at a predetermined value to permanently connect the converter circuit 5 to the supply lines 7a and 7b.

When the network-powered device PD needs to be isolated from the supply lines 7a and 7b again, the secondary side of the network-powered device PD signals a suitable disconnection signal to the control circuit 9. By way of example, this may involve a disconnection signal produced by software or hardware. As soon as the second circuit portion 9b of the control circuit 9 recognizes the disconnection signal (step 35), the converter circuit 5 is isolated from the supply lines 7a and 7b (step 36) and, hence, deactivated by virtue of the switching element 8 being opened. The network-powered device disconnects.

Subsequently, the supply unit PSE recognizes a rise in the internal resistance at its supply output and then deactivates the provision of the supply voltage $V_{PSE}$. Hence, the supply unit PSE can also enter an energy-saving state in which, as described above, only detection pulses 10 are emitted at a predetermined interval of time. Hence, the supply unit PSE and the network-powered device PD are again in a state of very low power draw, with the result that the requirements of current and future standards in respect of energy efficiency in standby states can be observed.

The circuit arrangements and methods described above are particularly suitable to supply power to terminals switched on and off under user control. Such a device is particularly what is known as a "zero client," which merely comprises a graphics chip to display screen masks and a simple interface connection to connect a keyboard, mouse and similar input devices. The actual computation power is provided by a centrally operated server system in this case. The use of such terminal units of minimal design, which are also remotely powered particularly efficiently via a network, allows particularly the energy efficiency of medium-sized and larger company networks to be improved. In this case, each user can switch their terminal on or off individually, as known previously from single station computers.

The aforementioned energy-saving circuit and associated methods are equally suitable for use in different standards to remotely power devices. In this case, the only important aspect for operation of the circuit is that voltage pulses are transmitted more or less regularly via the network lines used to connect the network-powered device.

This does not necessarily have to involve the detection pulses 10 based on the PoE standard. It is also conceivable to use other or additional data, signaling or supply pulses from a network protocol to charge the energy buffer C2. In particular, relatively powerful microcontrollers used as control circuits can be provided with an adequate operating voltage if the supply unit regularly also emits classification pulses or temporarily enters a starting phase.

For the method, it is also irrelevant whether the remote powering is effected via wire pairs for signaling the data themselves, as shown in FIG. 1, or via separate wire pairs of a network line.

The invention claimed is:

1. An energy-saving circuit for a network-powered device having a converter circuit that recognizes and responds to detection pulses which can be provided by a power sourcing equipment via a network and produces an operating voltage ($V_{OUT}$) for the network-powered device from a supply voltage ($V_{PSE}$) which can be provided by the power sourcing equipment via the network, comprising:

at least one switching element that breaks at least one electrical connection between the network and the converter circuit, at least one control circuit that actuates the at least one switching element on the basis of control signals that switch the network-powered device on and/or off and are received from a secondary side of the network-powered device, wherein the at least one control circuit, in a switched-off state of the network-powered device, opens the at least one switching element to break the at least one electrical connection between the network and the converter circuit and, in a switched-on state of the network-powered device, closes the at least one switching element to close the at least one electrical connection between the network and the converter circuit such that, in the switched-on state of the network-powered device, the converter circuit can react to a received detection pulse and a monitoring circuit of the power sourcing equipment can recognize that the network-powered device is connected to the power sourcing equipment, and at least one energy buffer connected on a network side of the at least one switching element, the energy buffer configured to store energy from voltage pulses provided from the power sourcing equipment via the network at regular intervals to constantly supply the control circuit with an operating power in the switched off state, wherein the energy saving circuit has an internal resistance above a predetermined limit such that the monitoring circuit of the power sourcing equipment does not recognize that the network-powered device is connected to the power sourcing equipment when the network-powered device is in the switched-off state.

2. The energy-saving circuit according to claim 1, wherein the energy buffer is in the form of a capacitor and the buffer capacitance is proportioned such that it is sufficient to supply the control circuit with an operating power for a predetermined period of time.

3. The energy-saving circuit according to claim 1, wherein at least one rectifier circuit is arranged between at least two supply lines of the network and the energy buffer of the energy-saving circuit.

4. The energy-saving circuit according to claim 1, wherein the at least one switching element is in the form of a MOSFET.

5. A network arrangement comprising:

power sourcing equipment that recognizes and supplies network-powered devices with a supply voltage ($V_{PSE}$), at least one network-powered device having an energy-saving circuit and a converter circuit that recognizes and responds to detection pulses which can be provided by a power sourcing equipment via a network and produces an operating voltage ($V_{OUT}$) for the network-powered device from a supply voltage ($V_{PSE}$) which can be provided by the power sourcing equipment via the network, and at least one network cable which connects the power sourcing equipment and the at least one network-powered device to one another;

wherein the energy-saving circuit comprises:

at least one switching element that breaks at least one electrical connection between the network cable and the converter circuit, at least one control circuit that actuates the at least one switching element on the basis of control signals that switch the network-powered device on and/or off and are received from a secondary side of the network-powered device, wherein the at least one control circuit, in a switched-off state of the network-powered device, opens the at least one switching element to break the at least one electrical connection between the network and the converter circuit and, in a switched-on state of the network-powered device, closes the at least one switching element to close the at least one electrical connection between the network and the converter circuit such that, in the switched-on state of the network-powered device, the converter circuit can react to a received detection pulse and a monitoring circuit of the power sourcing equipment can recognize that the network-powered device is connected to the power sourcing equipment, and at least one energy buffer connected on a network side of the at least one switching element, the energy buffer configured to store energy from voltage pulses provided from the power sourcing equipment via the network at regular intervals to constantly supply the control circuit with an operating power in the switched off state, wherein the energy saving circuit has an internal resistance above a predetermined limit such that the monitoring circuit of the power sourcing equipment does not recognize that the network-powered device is connected to the power sourcing equipment when the network-powered device is in the switched-off state.

6. The network arrangement according to claim 5, wherein the power sourcing equipment and the converter circuit of the at least one network-powered device are based on a Power-over-Ethernet standard, and detection pulses and/or classification pulses based on the Power-over-Ethernet standard are used to charge the energy buffer.

7. The network arrangement according to claim 5, wherein the network cable comprises at least two wires that provide the supply voltage ($V_{PSE}$) and at least two further wires electrically insulated therefrom, that transmit data from and/or to the network-powered device.

8. The network arrangement according to claim 5, wherein the network cable comprises at least four wires that provide the supply voltage ($V_{PSE}$) and transmit data from and/or to the network-powered device, and data to be transmitted are modulated as a high-frequency signal onto a DC voltage ($V_{PD}$) which is used as a supply voltage.

9. The network arrangement according to claim 6, wherein the network cable comprises at least two wires that provide the supply voltage ($V_{PSE}$) and at least two further wires electrically insulated therefrom, that transmit data from and/or to the network-powered device.

10. The network arrangement according to claim 6, wherein the network cable comprises at least four wires that provide the supply voltage ($V_{PSE}$) and transmit data from and/or to the network-powered device, and data to be transmitted are modulated as a high-frequency signal onto a DC voltage ($V_{PD}$) which is used as a supply voltage.

11. An energy-saving method for a network-powered device having a converter circuit that recognizes and responds to detection pulses which can be provided by a power sourcing equipment via a network and produces an operating voltage ($V_{OUT}$) for the network-powered device from a supply voltage ($V_{PSE}$) which can be provided by the power sourcing equipment via the network comprising:

storing electrical power from voltage pulses provided at regular intervals from a power sourcing equipment via a network in an energy buffer connected on a network side of the at least one switching element, the energy buffer configured to store energy from voltage pulses provided from the power sourcing equipment via the network at regular intervals to constantly supply the control circuit with an operating power in the switched off state, operating a control circuit that actuates the at least one switching element on the basis of control signals that switch the network-powered device on and/or off and are received from a secondary side of the network-powered device, wherein the at least one control circuit, in a switched-off state of the network-powered device, opens the at least one switching element to break the at least one electrical connection between the network and the converter circuit and, in a switched-on state of the network-powered device, closes the at least one switching element to close the at least one electrical connection between the network and the converter circuit such that, in the switched-on state of the network-powered device, the converter circuit can react to a received detection pulse and a monitoring circuit of the power sourcing equipment can recognize that the network-powered device is connected to the power sourcing equipment with power stored in the energy buffer, recognizing, by the control circuit, a first device-end control signal that switches on the network-powered device from a quiescent or energy saving state, and actuating, by the control circuit, a switching element to make an electrical connection between the network and a converter circuit of the network-powered device having an internal resistance above a predetermined limit such that the monitoring circuit of the power sourcing equipment does not recognize that the network-powered device is connected to the power sourcing equipment when the network-powered device is in the switched-off state.

12. The energy-saving method according to claim 11, wherein after the electrical connection has been made performing:

recognizing, by the power converter circuit, a detection pulse, recognizing, by the power sourcing equipment in the network, a power class of the electrical device, providing, by the power sourcing equipment, the supply voltage (Vpse) via the network, and providing, by the converter circuit, an operating voltage (Vout) to operate the device from the supply voltage (Vpse) provided via the network.

13. The method according to claim 11, further comprising:

recognizing, by the control circuit, a second device-end control signal that switches off the network-powered device, and actuating, by the control circuit, the switching element to break the electrical connection between the network and the converter circuit of the electrical device.

14. The method according to claim 12, further comprising:

recognizing, by the control circuit, a second device-end control signal that switches off the network-powered device, and actuating, by the control circuit, the switching element to break the electrical connection between the network and the converter circuit of the electrical device.

* * * * *